(12) United States Patent
Choi et al.

(10) Patent No.: US 9,447,957 B2
(45) Date of Patent: Sep. 20, 2016

(54) LED LAMP

(75) Inventors: Hyuck Jung Choi, Ansan-si (KR);
Kyung Hee Ye, Ansan-si (KR)

(73) Assignee: Seoul Semiconductor Co., Ltd., Ansan-si (KR)

(*) Notice: Subject to any disclaimer, the term of this patent is extended or adjusted under 35 U.S.C. 154(b) by 210 days.

(21) Appl. No.: 14/129,795

(22) PCT Filed: Jun. 20, 2012

(86) PCT No.: PCT/KR2012/004879
§ 371 (c)(1),
(2), (4) Date: Jan. 22, 2014

(87) PCT Pub. No.: WO2013/002511
PCT Pub. Date: Jan. 3, 2013

(65) Prior Publication Data
US 2014/0133145 A1 May 15, 2014

(30) Foreign Application Priority Data

Jun. 30, 2011 (KR) .................. 10-2011-0064751
Jun. 30, 2011 (KR) .................. 10-2011-0064757
Jun. 30, 2011 (KR) .................. 10-2011-0064758

(51) Int. Cl.
*F21V 1/00* (2006.01)
*F21V 29/00* (2015.01)
*F21K 99/00* (2016.01)
*F21V 29/74* (2015.01)
*F21Y 101/02* (2006.01)

(52) U.S. Cl.
CPC ............... *F21V 29/22* (2013.01); *F21K 9/135* (2013.01); *F21V 29/004* (2013.01); *F21V 29/74* (2015.01); *F21Y 2101/02* (2013.01)

(58) Field of Classification Search
CPC ...... F21K 9/135; F21V 29/02; F21V 29/004; F21Y 2105/00
USPC ............................................ 362/294, 249.02
See application file for complete search history.

(56) References Cited

U.S. PATENT DOCUMENTS

| 8,287,161 | B2 | 10/2012 | Zhang et al. | |
| 2003/0063476 | A1* | 4/2003 | English ............... | B60Q 1/2696 362/545 |
| 2010/0328947 | A1 | 12/2010 | Chang et al. | |
| 2011/0141726 | A1 | 6/2011 | Xue et al. | |

(Continued)

FOREIGN PATENT DOCUMENTS

| CN | 102022648 | 4/2011 |
| JP | 2010-086946 | 4/2010 |
| JP | 2011-054577 | 3/2011 |

(Continued)

OTHER PUBLICATIONS

International Search Report issued on Jan. 2, 2013 in the International Application No. PCT/KR2012/004879.

*Primary Examiner* — Ali Alavi
(74) *Attorney, Agent, or Firm* — H.C. Park & Associates, PLC

(57) ABSTRACT

The present invention relates to an LED lamp. In the LED lamp, light may be emitted in lateral and rear directions as well as in a front direction to obtain light distribution characteristics similar to those of an incandescent lamp, and heat generated when the LED emits light may be effectively dissipated.

32 Claims, 14 Drawing Sheets

(56) References Cited

U.S. PATENT DOCUMENTS

2013/0027928 A1* 1/2013 Kang ............... F21K 9/135
                                                  362/235
2013/0058098 A1* 3/2013 Kim ............... F21V 29/004
                                                  362/294

FOREIGN PATENT DOCUMENTS

| JP | 2011-124207 | 6/2011 |
| KR | 10-2007-0073317 | 7/2007 |

* cited by examiner

LED LAMP

CROSS-REFERENCE TO RELATED APPLICATIONS

This application is the National Stage entry of International Application PCT/KR2012/004879, filed on Jun. 20, 2012, and claims priority from and the benefit of Korean Patent Application No. 10-2011-0064751, filed on Jun. 30, 2011, Korean Patent Application No. 10-2011-0064757, filed on Jun. 30, 2011, and Korean Patent Application No. 10-2011-0064758, filed on Jun. 30, 2011, which are incorporated herein by reference for all purposes as if fully set forth herein.

BACKGROUND OF THE INVENTION

1. Field

The present invention relates to a light-emitting diode (LED) lamp, and more particularly, to an LED lamp which can realize light distribution characteristics similar to those of an incandescent lamp by radiating light not only forwards but also sideways and backwards and effectively dissipate heat that is generated through the light emission of an LED.

2. Discussion of the Background

Recently, light-emitting diodes (LEDs) are being used as light sources in a variety of fields due to their variety of characteristics, including high efficiency, clearness or the like. Among them, in the illumination field, conventional lamps are being rapidly replaced with LED lamps to which LEDs are applied.

LEDs used as light sources in such LED lamps have an orientation angle of 120°. Conventionally, the characteristics of the orientation angle were not regarded as a significant issue although light efficiency, longevity or the like was regarded important when LEDs were applied to lamps.

Recently, however, demands for LED lamps of which an orientation angle and light distribution characteristics are similar to those of existing incandescent lamps are increasing.

In response to such demands, several types of LED lamps, such as a lens type, a reflector type and a vertical LED type, were developed in order to realize the orientation angle and light distribution characteristic similar to those of conventional incandescent lamps.

The reflector type LED lamp can efficiently send light to the rear of an LED, i.e. a light source. However, light efficiency is low, which is problematic. In addition, although the lens type LED lamp is more effective than the reflector type LED lamp in terms of light control and light efficiency, there is a technical problem in that it is difficult to realize a light orientation characteristic. In particular, it is very difficult to send light to the rear side of LEDs, which is problematic.

In addition, in the vertical LED type lamp, the upper portions of LEDs are disposed perpendicular to a bulb such that light is emitted sideways. This consequently leads to a satisfactory light distribution curve. However, it is difficult to control the LEDs to uniformly radiate light in all directions. Furthermore, since substrates on which LEDs are mounted must be divided, mounting works are difficult and the cost is increased, which are problematic.

Meanwhile, LEDs has a problem in that they generate a large amount of heat while emitting light. In order to use such LEDs for illumination, not only an improvement in the quality of light emission but also high-power light emission of several thousand lumens is required. Since this high-powered light emission is proportional to an input current, an intended level of light power can be realized when a large current is provided. However, an increase in the input current leads to an increased amount of heat, which is problematic.

Therefore, an approach that can overcome the lower performance and reliability of LEDs due to the heat while producing high-powered light is required. The heat generated from LEDs lowers the efficiency of the operation of LEDs and distorts the color of light by deteriorating a fluorescent material that is used for converting the wavelength of light, which are problematic. Furthermore, heat generated from LEDs can have an adverse effect on the operation of other electronic components disposed around LEDs.

Accordingly, as for LED lamps, it is becoming more important to develop a heat dissipation structure that can effectively dissipate heat generated from LEDs, and thus a variety of research and development is underway.

SUMMARY

The present invention has been made to solve the foregoing problems with the related art, and therefore the present invention is intended to provide a light-emitting diode (LED) lamp in which LEDs are disposed on upper and side portions of a heatsink respectively such that the LED lamp can radiate light not only forwards but also sideways and backwards, thereby realizing light distribution characteristics similar to those of an incandescent lamp.

The present invention is also intended to provide an LED lamp in which a reflecting surface is provided through modification of a partial shape of the heatsink. The reflecting surface is disposed at a side of the heatsink to reflect light that is radiated sideways and backwards, thereby increasing the orientation angle.

The present invention is also intended to provide an LED lamp which can efficiently dissipate heat generated from a light source.

In order to realize the foregoing object, the present invention provides a light-emitting diode (LED) lamp that includes: at least one first light source mounted on a first substrate; at least one second light source mounted on a second substrate; and a heatsink for dissipating heat generated from the first and second light sources to an outside, wherein the heatsink comprises a first mounting area on which the first substrate is mounted and an inclined surface on which the second substrate is mounted, at least a portion of the inclined surface being inclined downwards and inwards from a circumference of the first mounting surface.

Also provided is a LED lamp that includes: a substrate; at least one first light source mounted on a first surface of the substrate; at least one second light source mounted on a second surface of the substrate; and a heat dissipation part comprising a first heatsink which is disposed at a second surface side of the substrate to correspond to the first light source and a second heatsink which is disposed at a first surface side of the substrate to correspond to the second light source.

Also provided is a LED lamp that includes: a substrate; at least one LED disposed on a first surface of the substrate; a lower heat dissipation pad disposed on a second surface of the substrate; and a heatsink directly adjoining to the lower heat dissipation pad, the heatsink dissipating heat generated from the first LED outwards.

Also provided is a LED lamp that includes: a substrate; at least one first LED disposed on a first surface of the substrate; a first mounting pad interposed between the substrate and the first LED; a second LED disposed on a second surface of the substrate; a second mounting pad interposed between the substrate and the second LED; a lower heat dissipation pad disposed on the second surface of the substrate; an upper heat dissipation pad disposed on the first surface of the substrate; and a heatsink directly adjoining to the lower heat dissipation pad, the heatsink dissipating heat generated from the first LED outwards.

According to the present invention, the light sources are disposed on the top and side surfaces of the heatsink respectively such that light can be radiated not only forwards but also sideways and backwards. This consequently leads to an advantage in that light distribution characteristics similar to those of an incandescent lamp can be realized.

In addition, according to the present invention, the reflecting surface is provided through modification of a partial shape of the heatsink. This leads to an advantage in that the reflecting surface can reflect light that is radiated sideways and backwards, thereby increasing the orientation angle.

Furthermore, according to the present invention, the first and second light sources are mounted on the top and bottom surfaces of the substrate, respectively, in order to increase the orientation angle. The first and second light sources can also be disposed on areas corresponding to the first and second light sources, respectively, in order to dissipate heat generated from the first and second light sources, thereby improving light dissipation efficiency.

In addition, according to the present invention, the light dissipation pads are provided on the top and bottom surfaces of the substrate on which LEDs are mounted. The lower heat dissipation pad has a heat dissipation structure that directly adjoins to the heatsink. Accordingly, the effect of heat dissipation can be significantly improved.

Furthermore, according to the present invention, the heat conduction via which adjoins to the heat dissipation pad, the heat conduction pattern which can disperse heat on the same level as the substrate, or the like can be added. There is an advantage in that the heat dissipation effect can be further improved.

DETAILED DESCRIPTION OF THE ILLUSTRATED EMBODIMENTS

Figure 1:
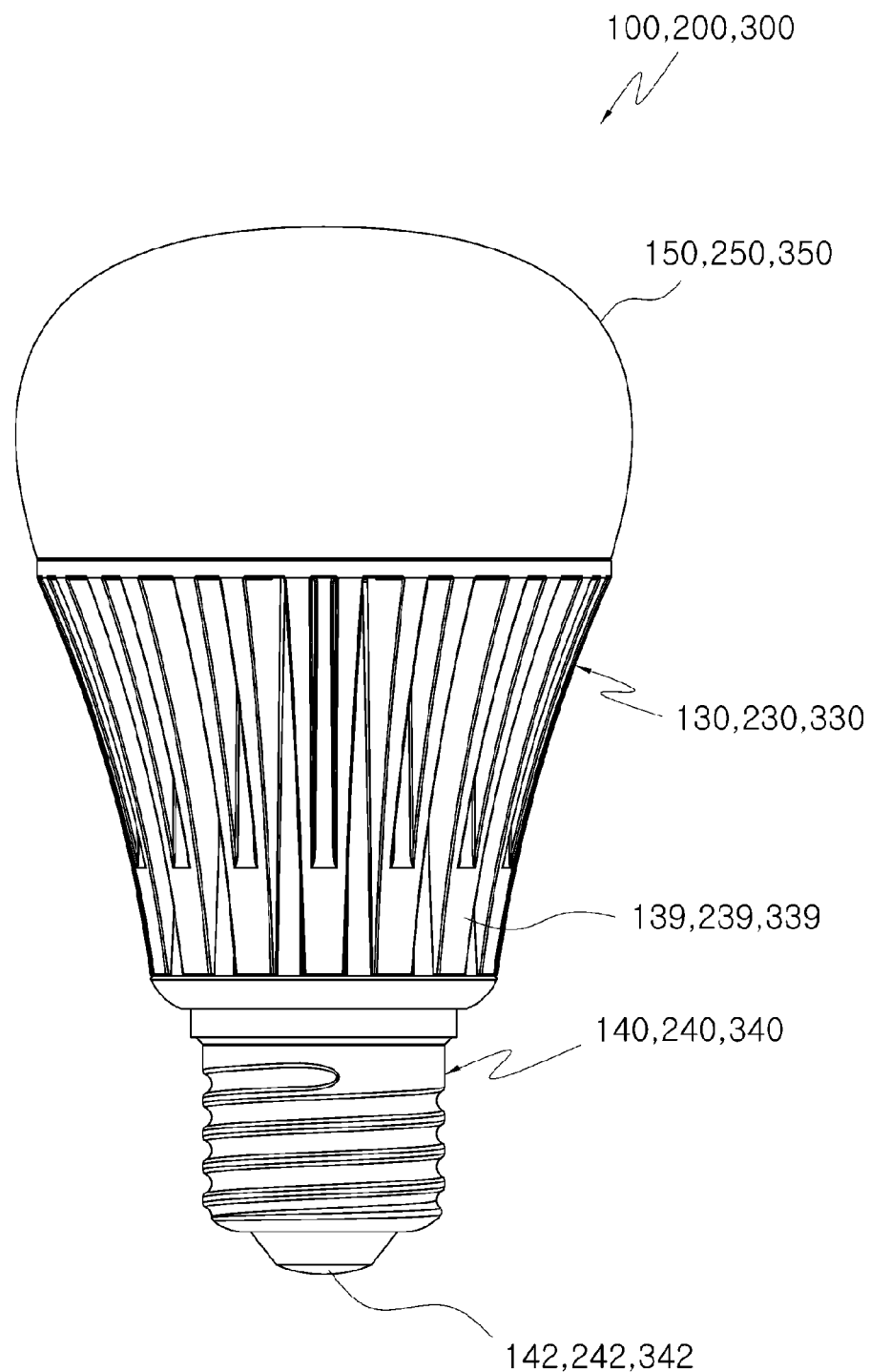
FIG. 1 is a view showing the contour of an LED lamp according to the present invention.

Reference will now be made in detail to various exemplary embodiments of the present invention, examples of which are illustrated in the accompanying drawings.

Although the following embodiments of the present invention can be modified into a variety of different forms, the scope of the present invention is by no means limited to the following embodiments. The embodiments of the present invention are provided in order to fully convey the scope of the present invention to a person skilled in the art. In the disclosure of the present invention, the terms used herein are defined considering their functions. It should be understood that the terms be interpreted depending on the intention of a person skilled in the art or the practice in the art and shall not be interpreted as limiting the elements of the present invention.

First Embodiment

As a technical feature of an LED lamp 100 according to a first exemplary embodiment of the present invention, first and second mounting areas 131 and 132a are provided on the top and side surfaces of a heatsink 130, respectively. The second mounting area 132a is inclined from the first mounting area 131 at a preset angle. A majority of light generated from a second light source 112 disposed on the second mounting area 132a can be directly radiated to side and lower portions of a cover part 150. This can consequently increase an orientation angle, thereby realizing light distribution characteristics similar to those of an incandescent lamp.

The LED lamp 100 according to the first exemplary embodiment of the present invention includes light sources, the heatsink 130, a base part 140 and the cover part 150.

The light sources 111 and 112 are mounted on the substrates 121 and 122 to generate light when electric power is applied thereto. The light sources 111 and 112 according to the present invention include the first light source 111 mounted on the first substrate 121 and the second light source 112 mounted on the second substrate 122.

That is, according to the present invention, the light sources 111 and 112 include the first light source 111 and the second light source 112 which are mounted on the first substrate 121 and the second substrate 122, respectively. The first light source 111 radiates light forwards of the LED lamp 100, i.e. upwards in FIG. 2. The second light source 112 radiates light sideways and backwards of the LED lamp 100, i.e. to the right and left and downwards in FIG. 2.

Here, the second substrate 122 is disposed so as to be inclined a preset angle with respect to the horizontal surface of the first substrate 121 such that a majority of light emitted from the second light source 112 mounted on the second substrate 122 can be directly radiated sideways and backwards.

Accordingly, in the LED lamp 100 according to the present invention, light emitted from the first light source 111 and the second light source 112 can be directed to the front, side and rear portions of the cover part 150, thereby increasing the overall orientation angle and widening a light distribution area. In addition, the LED lamp can overcome the limitation of LEDs which radiate light in a linear direction and thus realize light distribution characteristics similar to those of an incandescent lamp.

Here, the first light source 111 and the second light source 112 are implemented as typical LEDs. These light sources can be provided as a chip on board (COB) in which a plurality of LED chips is integrated on a board to form a light-emitting chip, a package type LED device which includes a lead frame, or a combination thereof.

In addition, the color of light emitted from the LEDs can be any one of red, blue, green and white. For example, the first light source 111 provided on the first substrate 121 can emit red light and the second light source 112 provided on the second substrate 122 can emit blue light in order to improve light reproducibility.

The substrate provides a substrate member on which the first light source 111 and the second light source 112 which emit light are mounted, is electrically connected with an external power source through a power cable (not shown), and has a preset circuit pattern formed on the top surface which is electrically connected to the light sources mounted on the substrate.

The substrate includes the first substrate 121 on which the first light source 111 is mounted and the second substrate 122 on which the second light source 112 is mounted. The first substrate 121 is mounted on the first mounting area 131 of the heatsink 130, and the second substrate 122 is mounted on the second mounting area 132a of the heatsink 130.

Figure 2:
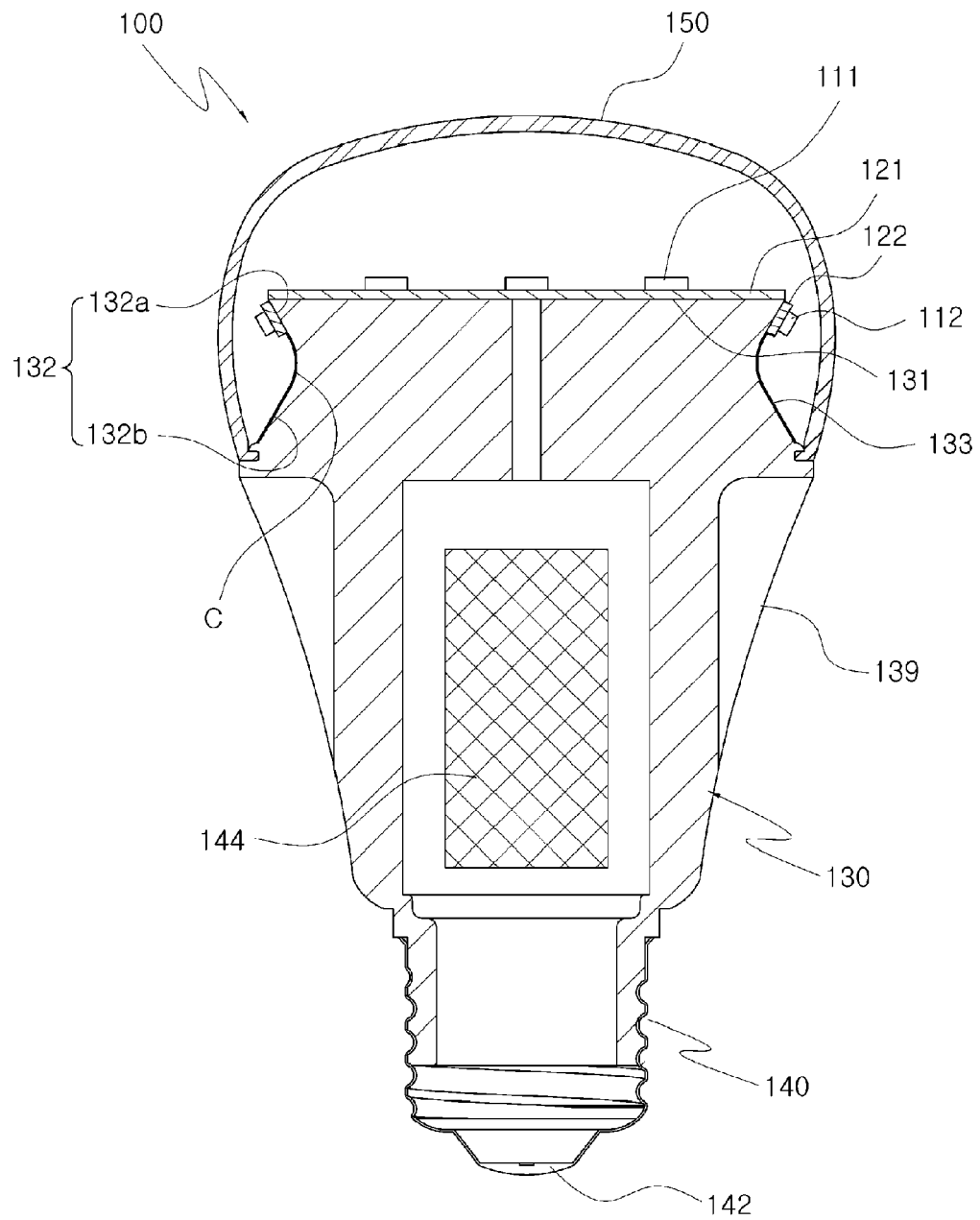
FIG. 2 is a cross-sectional view showing the inside of a first embodiment of the LED lamp shown in FIG. 1.

That is, as shown in FIG. 2, the first substrate 121 has the shape of a disc or a polygonal plate, such as a triangular or quadrangular plate, and is fixed to the first mounting area 131 of the heatsink 130.

Here, although the first substrate 121 is shown as being assembled via a fastening member so as to be replaceable, this is not intended to be limiting. The first substrate 121 can be fixedly bonded to the first mounting area 131 of the heatsink via a heat dissipation pad (not shown).

In addition, the second substrate 122 is implemented as a flexible circuit board. The second substrate 122 is disposed in the shape of a belt along the circumference of the second mounting area 132a which is provided on the upper side portion of the heatsink 130, and is fixed to the second mounting area 132a.

Figure 4A:
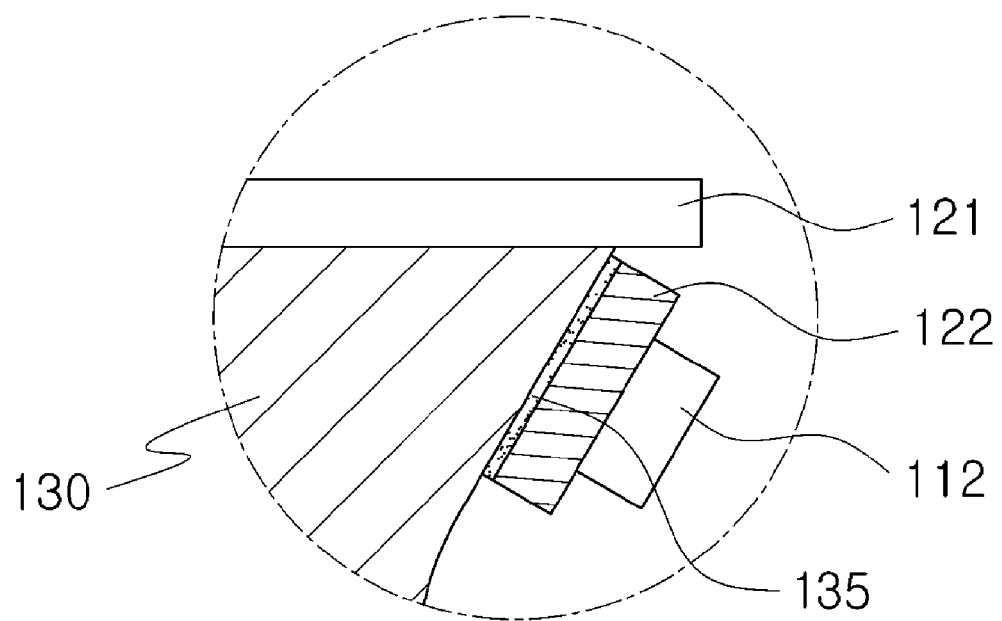
FIG. 4a, FIG. 4b, and FIG. 4c are views showing how a second substrate part is fixed to a heatsink in the first embodiment of the LED lamp.
Figure 4B:
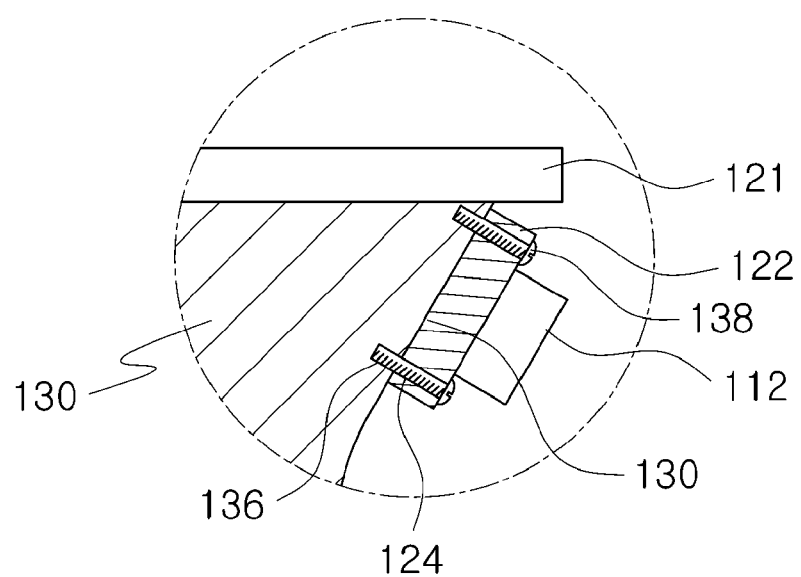
Figure 4C:
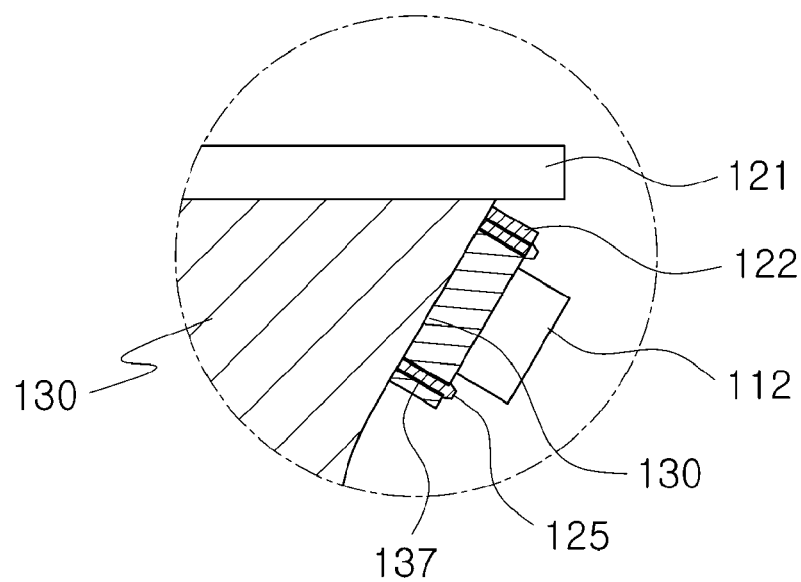

Here, the second substrate 122 can be fixed to the second mounting area 132a in a variety of methods. For example, as shown in FIG. 4a, the second substrate 122 can be fixed to the second mounting area 132a via a bonding layer 135. As shown in FIG. 4b, it is possible to use screw coupling, in which one or more coupling-holes 124 are formed in the second substrate 122, screw-holes 136 corresponding to the coupling-holes 124 are formed in the second mounting area 132a, and the second substrate 122 is fixed to the second mounting area 132a via bolt members 138. In addition, as shown in FIG. 4c, it is possible to use interference fitting in which one or more fixing pins 137 are formed to protrude outward from the second mounting area 132a, pin-holes 125 corresponding to the fixing pins 137 are formed in the second substrate 122, and the fixing pins 137 are interference fitted into the pin-holes 125.

Here, it should be understood that the fixing of the second substrate 122 shown in FIG. 4 be interpreted as an example provided for better understanding of the present invention, and a variety of known fastening mechanisms can be used.

In addition, the first substrate 121 and the second substrate 122 are electrically connected to each other by providing the first and second substrates 121 and 122 with a plug (not shown) and a socket (not shown) which corresponds to the plug and connecting the plug to the socket such that electric power supplied from a power supply 144 can be transmitted to the second substrate 122.

Of course, it is possible to connect the power supply 144 to each of the first substrate 121 and the second substrate 122 via cables (not shown) such that electric power can be supplied.

Figure 5:
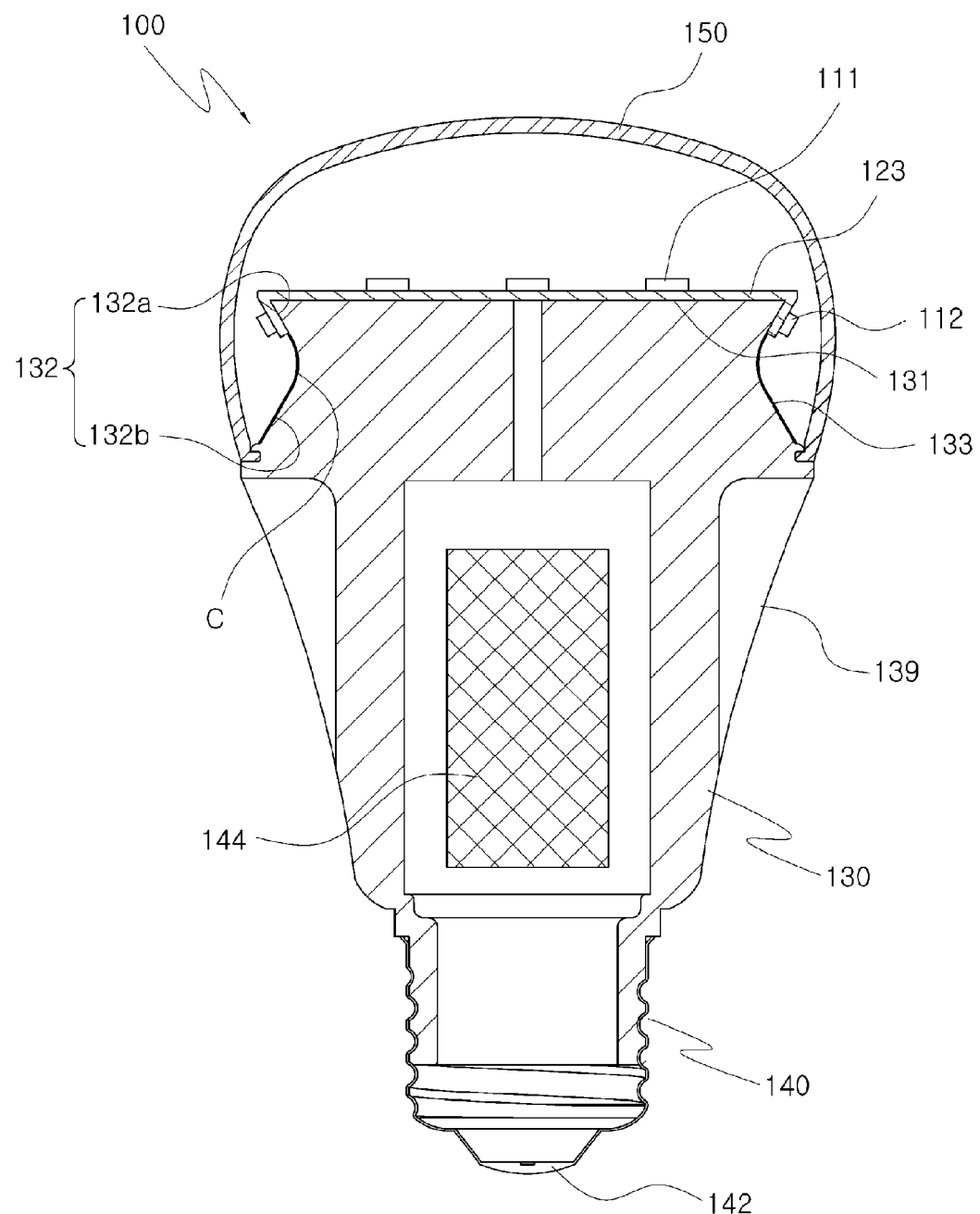
FIG. 5 is a view showing a case in which first and second substrates are integrally provided in the first embodiment of the LED lamp.

In the meantime, as shown in FIG. 5, the first substrate 121 and the second substrate 122 according to the first embodiment of the present invention can be provided as one substrate 123 which is a flexible circuit board. That is, the substrate 123 is provided as a flat flexible plate, the area of which is greater than that of the first mounting area 131 of the heatsink such that the outer circumferential portion of the substrate extends beyond the edge of the first mounting area 131 of the heatsink 130. The outer circumferential portion of the substrate is bent by the outer circumference of the first mounting area 131 such that the bent portion is mounted on the second mounting area 132a.

Here, the portion which extends beyond and is bent from the first mounting area 131 of the heatsink can be fixed to the second mounting area 132a in the same fashion as described above (see FIG. 4a to FIG. 4c).

The heatsink 130 is coupled with the base part 140 to form the overall contour of the LED lamp 100 and provide the mounting areas on which the first and second substrates 121 and 122 are mounted. The heatsink 130 serves to dissipate heat generated through the light emission of the light sources to the outside.

This heatsink 130 can be made of a metal material having superior heat conductivity, such as Al, in order to effectively dissipate heat generated through the light emission of the light sources. A plurality of heat dissipation fins 139 may be provided on the outer surface of the heatsink, in particular, in the circumferential direction of the heatsink in order to increase heat dissipation efficiency by increasing the heat dissipation area.

The top surfaces of the heatsink 130, i.e. the first mounting area 131, is formed as a flat horizontal plane such that the first substrate 121 can be seated thereon. The heatsink 130 also has a slope 132, an upper side portion of which is bent inward.

As shown in FIG. 2 to FIG. 5, the slope 132 includes the second mounting area 132a on which the second substrate 122 is mounted and a reflecting surface 132b which reflects part of light emitted from the second light source 112.

The second mounting area 132a is provided with a shape that is inclined inward and downward a preset angle from the edge of the first mounting area 131 of the heatsink. Accordingly, when the second substrate 122 is mounted on the second mounting area 132a, the second substrate 122 is also inclined a preset angle from the first substrate 121 mounted on the first mounting area 131, so that a majority of light emitted from the second light source 112 mounted on the second substrate 122 straightly travels sideways and backwards of the cover part 150.

Accordingly, unlike the related art in which the substrate is mounted on the top surfaces of the heatsink, the present invention is characterized in that the second mounting area 132a is provided on the side portion of the heatsink that is inclined a preset angle and the second light source 112 is disposed on the second mounting area 132a. This consequently allows light to be directly radiated sideways and backwards of the cover part 150, thereby increasing the overall light distribution area.

In addition, the reflecting surface 132b is inclined downward and toward the cover part 150 from the end C of the second mounting area 132a such that part of light emitted from the second light source 112 that is directed toward the heatsink 130 instead of toward the cover part 150 can be reflected toward the cover part 150.

The reflecting surface 132b extends to the upper side of the heatsink 130 to which the lower end of the cover part 150 is coupled such that all of light emitted from the second light source 112 can be reflected toward the cover part 150.

Figure 3A:
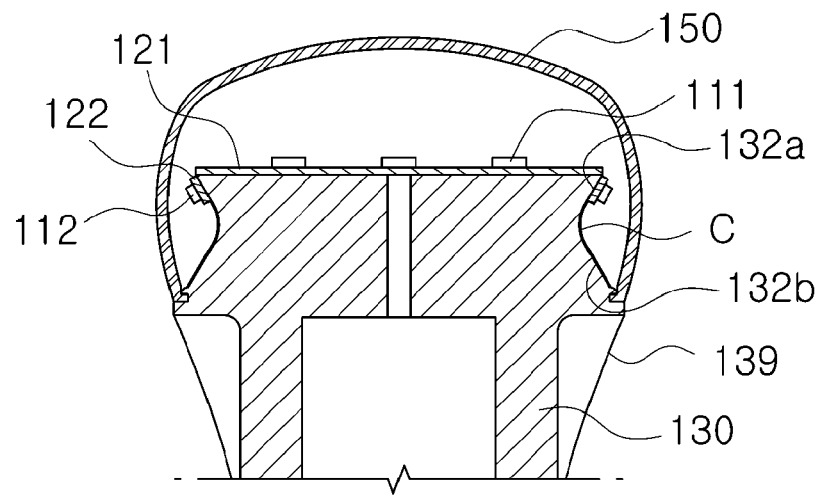
FIG. 3a, FIG. 3b, and FIG. 3c are views showing a variety of shapes of a heatsink slope of the first embodiment of the LED lamp.
Figure 3B:
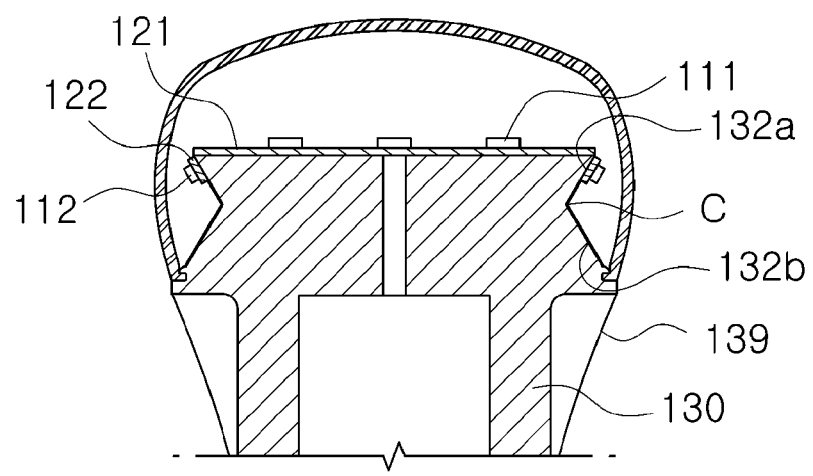
Figure 3C:
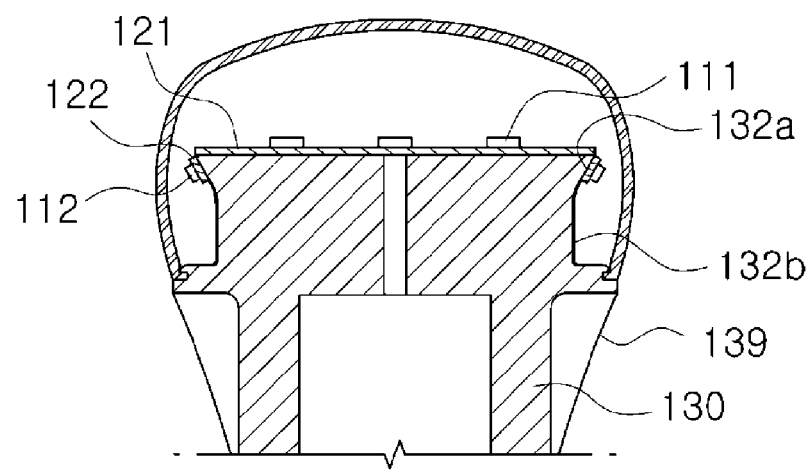

Here, the reflecting surface 132b can have an inclined shape that is inclined a preset angle downward and toward the cover part 150 from the end C of the second mounting area 132a (see FIG. 3a), a curved shape that is toward the cover part 150 as extending downward from the end C of the second mounting area 132a (see FIG. 3b), or a linear surface that extends vertically downward from the end C of the second mounting area 132a (see FIG. 3c).

Although the reflecting surface 132b was shown and illustrated as being linear or curved in the figures and description, this is not intended to be limiting. It should be understood that the reflecting surface 132b can have a variety of shapes in which a straight line and a curve are combined.

In addition, it should be understood that not only the reflecting surface 132b but also the remaining portion of the second mounting area 132a to which the second substrate 122 does not adjoin can be provided as a reflecting surface.

In the meantime, the reflecting surface 132b that serves to reflect part of light emitted from the second light source 112 in the direction toward the cover part 150 can be additionally provided with at least one reflecting layer 133 in order to increase reflectance.

The reflecting layer 133 is formed to a preset thickness on the surface of the reflecting surface 132b. The reflecting layer 133 is be made of a reflective material that has high light reflectance, such as Al or Cr, in a variety of methods, such as deposition, anodizing or plating.

The base part 140 which supplies electric power to the LED lamp 100 is coupled to the lower portion of the heatsink 130. The base part 140 houses the power supply 144 which supplies the electric power to the LED lamp 100. The base part 140 also includes a socket-shaped connecting part 142 on the lower end which can receive electric power from the outside and supply the received electric power to the power supply 144.

In addition, the cover part 150 having an inner space is provided over the heatsink 130 such that the cover part 150 can radiate light emitted from the first and second light sources 111 and 112 to the outside while protecting the first and second light sources 111 and 112 from the outer atmosphere.

The cover part 150 is coupled with the upper side of the heatsink 130 such that it covers all of the first light source 111, the second mounting area 132a and the reflecting surface 132b from above. That is, the lower end of the cover part 150 which is coupled with the heatsink 130 is positioned below the lower end of the reflecting surface 132b such that all of light reflected from the reflecting surface 132b can be radiated to the outside through the cover part 150.

In addition, it is preferred that the cover part 150 be provided as a light-diffusing cover that can diffuse light emitted from the first and second light sources 111 and 112 before radiating it to the outside.

In the meantime, a wavelength-converting layer (not shown) can be provided inside the cover part 150 or in the space of the cover part 150 in order to covert the wavelength of light emitted from the first or second light source 111 or 112. The wavelength-converting layer can be applied to a preset thickness on the inner surface of the cover part 150, or be formed of a wavelength-converting material that is contained in the material of the cover part 150.

According to the present invention as described above, the light sources are disposed on the upper and side surfaces of the heatsink respectively such that light can be radiated not only forwards but also sideways and backwards. This consequently leads to an advantage in that light distribution characteristics similar to those of an incandescent lamp can be realized.

In addition, according to the present invention, the reflecting surface is provided through modification of a partial shape of the heatsink. This leads to an advantage in that the reflecting surface can reflect light that is radiated sideways and backwards, thereby increasing the orientation angle.

Second Embodiment

As a technical feature of an LED lamp 200 according to a second exemplary embodiment of the present invention, light sources are mounted on the top and bottom surfaces of a substrate 220, respectively, and heat dissipation parts can be disposed on both areas of the substrate 220 that correspond to the light sources in order to effectively dissipate heat generated from the light sources.

The LED lamp 200 according to the second exemplary embodiment of the present invention includes a substrate 220, a first light source 211, a second light source 212, heat dissipation parts 230 and 260, and a cover part 250.

The first light source 211 and the second light source 212 are mounted on the substrate 220 to emit light outwards when electric power is induced thereto. The first light source 211 is mounted on the inner area of the top surfaces of the substrate 220, and the second light source 212 is mounted on the circumferential area of the bottom surface of the substrate 220.

Here, the first light source 211 and the second light source 212 are implemented as typical LEDs. These light sources can be provided as a chip on board (COB) in which a plurality of LED chips is integrated on a board to form a light-emitting chip, a package type LED device which includes a lead frame, or a combination thereof. The color of light emitted from the LEDs can be any one of red, blue, green and white.

Accordingly, light emitted from the first light source 211 travels forward, and light emitted from the second light source 212 is radiated sideways and backwards.

In this fashion, according to the present invention, the first light source 211 and the second light source 212 are mounted on the top surface and the bottom surface of the substrate, respectively, in order to radiate light to outer areas by dividing the areas.

The first light source 211 and the second light source 212 are mounted on substrate 220. The substrate 220 is a substrate member which is electrically connected with external power that is supplied through a power cable (not shown). A preset circuit pattern is formed on the substrate 220 so as to be electrically connected with the first light source 211 and the second light source 212.

The substrate 220 is mounted on a mounting area 231 which is formed on the top surface of a first heatsink 230. The area of the substrate 220 is wider than the mounting area 231 such that the outermost edge of the substrate 220 can protrude outward from the mounting area 231. Accordingly, the second light source 212 mounted on the bottom surface of the substrate 220 can be disposed along the edge or circumference of the bottom surface of the substrate 220 that protrudes outward from the mounting area 231.

Here, the substrate 220 can have the shape of a disc or a polygonal plate, such as a triangular or quadrangular plate.

The substrate 220 can be assembled to the mounting area via a fastening member so as to be replaceable, or fixedly bonded to the mounting area 231 via a heat dissipation pad (not shown).

The heat dissipation parts 230 and 260 serve to dissipate heat generated through the light emission of the light sources 211, 212 and 213 to the outside, and a base part 240 which receive electric power from the outside is provided on the lower portion.

Here, base part 240 houses a power supply (not shown) which supplies the electric power to the substrate 220. The base part 240 also includes a typical socket-shaped connecting part 242 on the lower end which can receive electric power from the outside and supply the received electric power to the power supply. The connecting part 242 is fabricated in the same shape as a socket of a typical incandescent lamp so as to replace the incandescent lamp.

The heat dissipation parts 230 and 260 include a first heatsink 230 and a second heatsink 260 which are disposed at positions corresponding to the first light source 211 and the second light source 212, respectively, such that heat dissipated from the light sources 211 and 212 can be efficiently dissipated.

Figure 6:
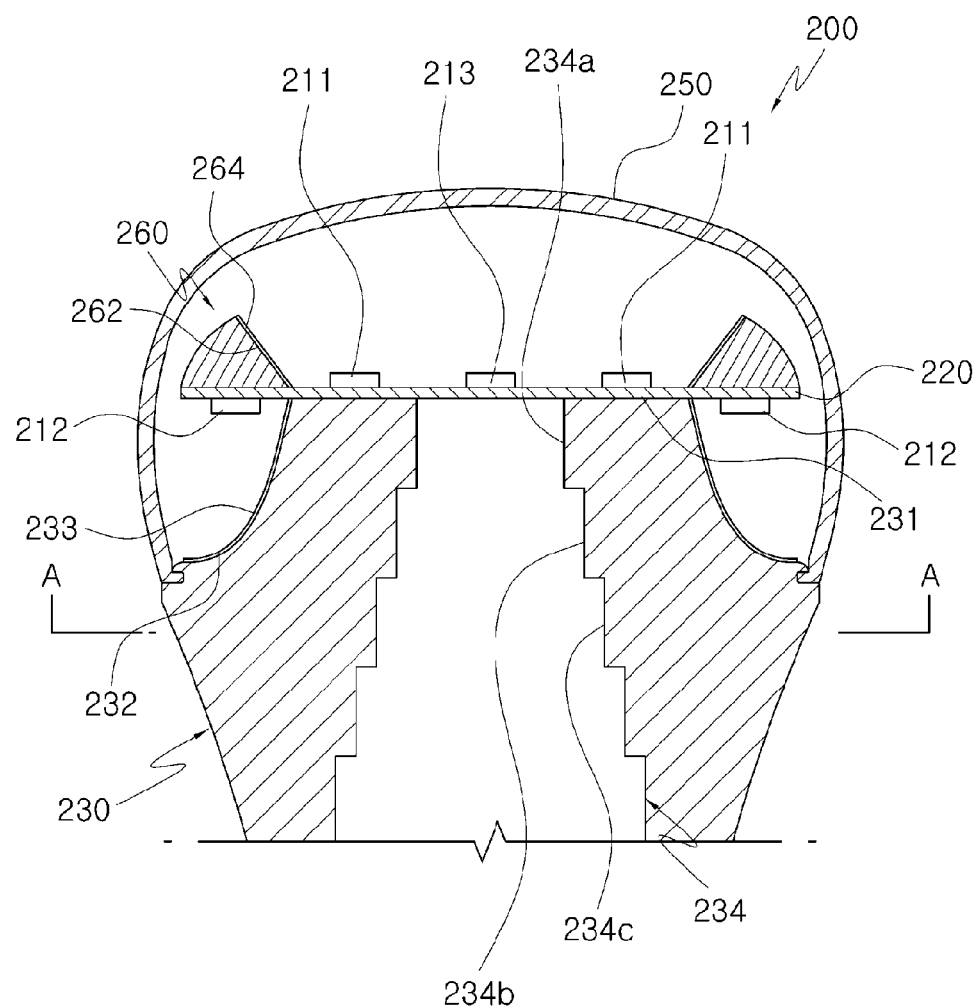
FIG. 6 is a cross-sectional view showing a second embodiment of the LED lamp according to the present invention.
Figure 7:
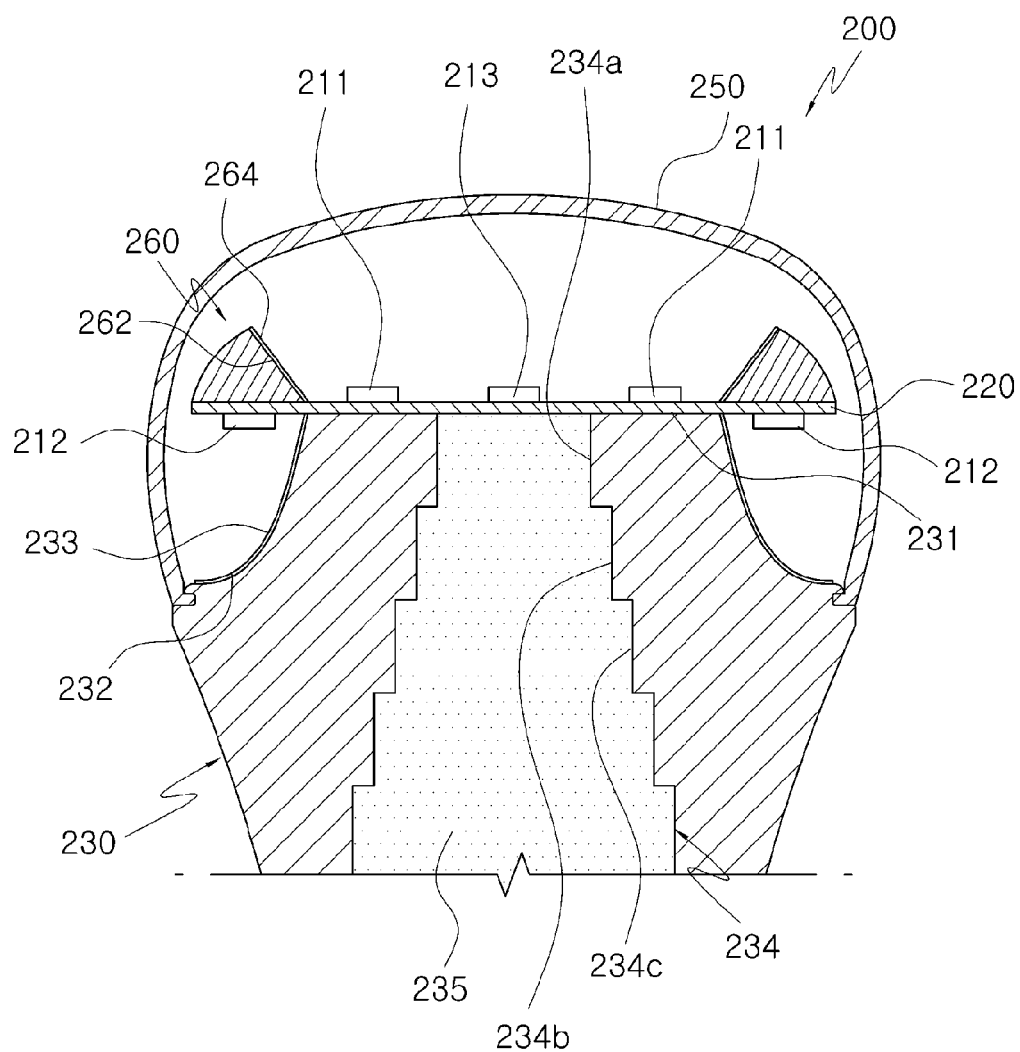
FIG. 7 is a cross-sectional view showing a modified embodiment of the second embodiment of the LED lamp according to the present invention.
Figure 8A:
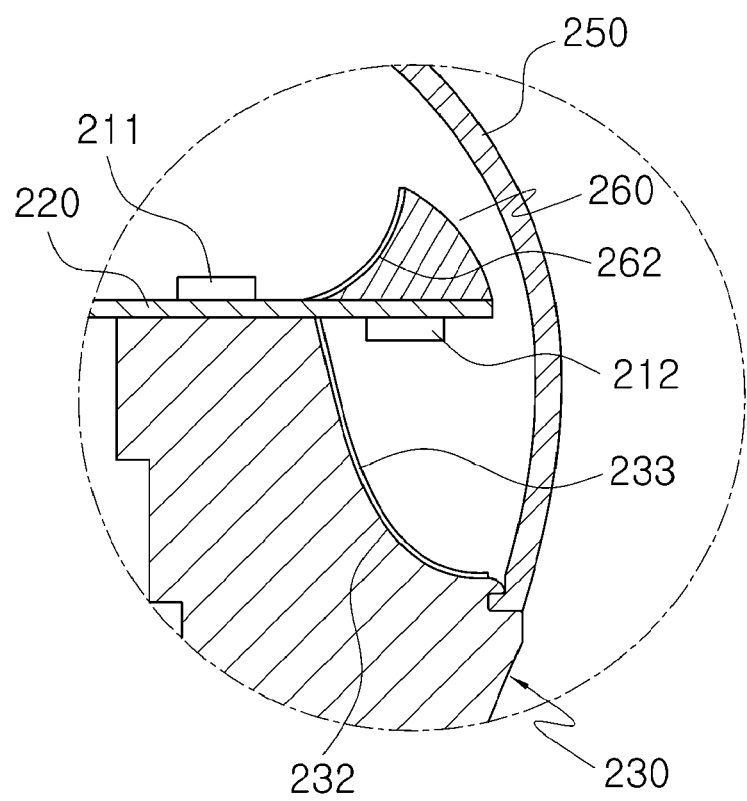
FIG. 8a and FIG. 8b are views showing a variety of shapes of a reflecting surface applied to FIG. 6 and FIG. 7.
Figure 8B:
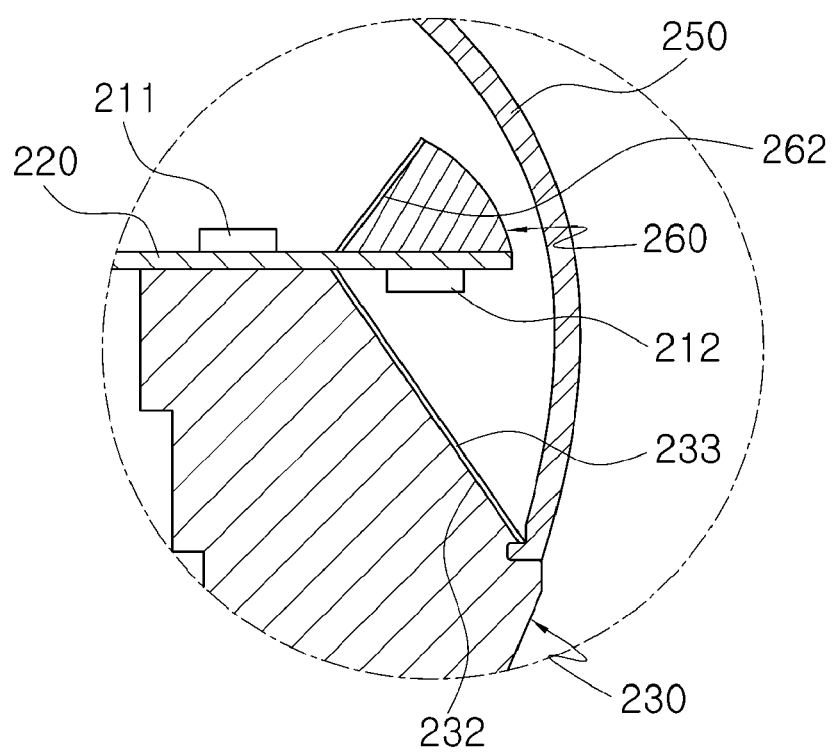

That is, as shown in FIG. 6 and FIG. 7, the first heatsink 230 has the mounting area 231 on the top surface such that the substrate 220 can be mounted, and is provided on the bottom side of the substrate 220 so as to correspond to the position of the first light source 211 which is mounted on the inner area of the top surface of the substrate 220. The second heatsink 260 is provided on the upper side of the substrate 220 so as to correspond to the position of the second light source 212 which is mounted on the circumferential area of the bottom surface of the substrate 220.

When the mounting area 231 is coupled with the cover part 250, the mounting area 231 can be disposed at the middle of the height of the cover part 250. Accordingly, the first light source 211 and the second light source 212 which are mounted on the top and bottom surfaces of the substrate 220 are also disposed at the middle of the height of the cover part 250. Light emitted from the first light source 211 is radiated to the outside through the upper area of the cover part 250, and light emitted from the second light source 212 is radiated to the outside through the lower area of the cover part 250.

Here, the portion of the substrate which adjoins to the mounting area 231 of the first heatsink 230 and the bottom surface of the second heatsink 260 can directly adjoin to a metal layer including a copper film formed in the substrate 220 via face-to-face contact, thereby increasing heat conduction to the heat dissipation parts. Typically, in the case of a metal circuit board, an insulation layer and an interconnection layer are stacked on the metal layer. The insulation layer and the interconnection layer are removed from the portion of the substrate which adjoins to the mounting area 231 and the bottom surface of the second heatsink 260 such that the metal layer can directly adjoin to the heat dissipation parts 230 and 260 via face-to-face contact. In addition, in the case of a printed circuit board, it is possible to increase heat conductivity by forming a copper film on the portion which adjoins to the heat dissipation parts 230 and 260. It is preferred that a mask layer formed on the copper film can be removed.

In the LED lamp 200 according to the second embodiment of the present invention, the first and second heatsinks 230 and 260 are provided at positions on both sides of the substrate 220 that correspond to the first and second light sources 211 and 212, more particularly, in the sequence of the first light source 211, the substrate 220 and the first heatsink 230 or at positions where the first heatsink 230, the substrate 220 and the first light source 211 are arranged in a line. Heat generated from the first light source 211 is dissipated after being transmitted to the first heatsink 230 through the substrate 220. Heat generated from the second light source 212 is dissipated after being transmitted to the second heatsink 260 through the substrate 220. Accordingly, it is possible to rapidly dissipate heat that has been transmitted to the substrate 220.

Here, the first heatsink 230 can have a hollow central section, the upper and lower ends of which are opened in the height direction. Accordingly, air is contained in the central section of the first heatsink 230 and directly contacts the bottom surface of the substrate 220 such that heat that has been transmitted to the substrate 220 from the light source during the light emission of the light source can be dissipated into the air through direct contact with the air.

Figure 9:
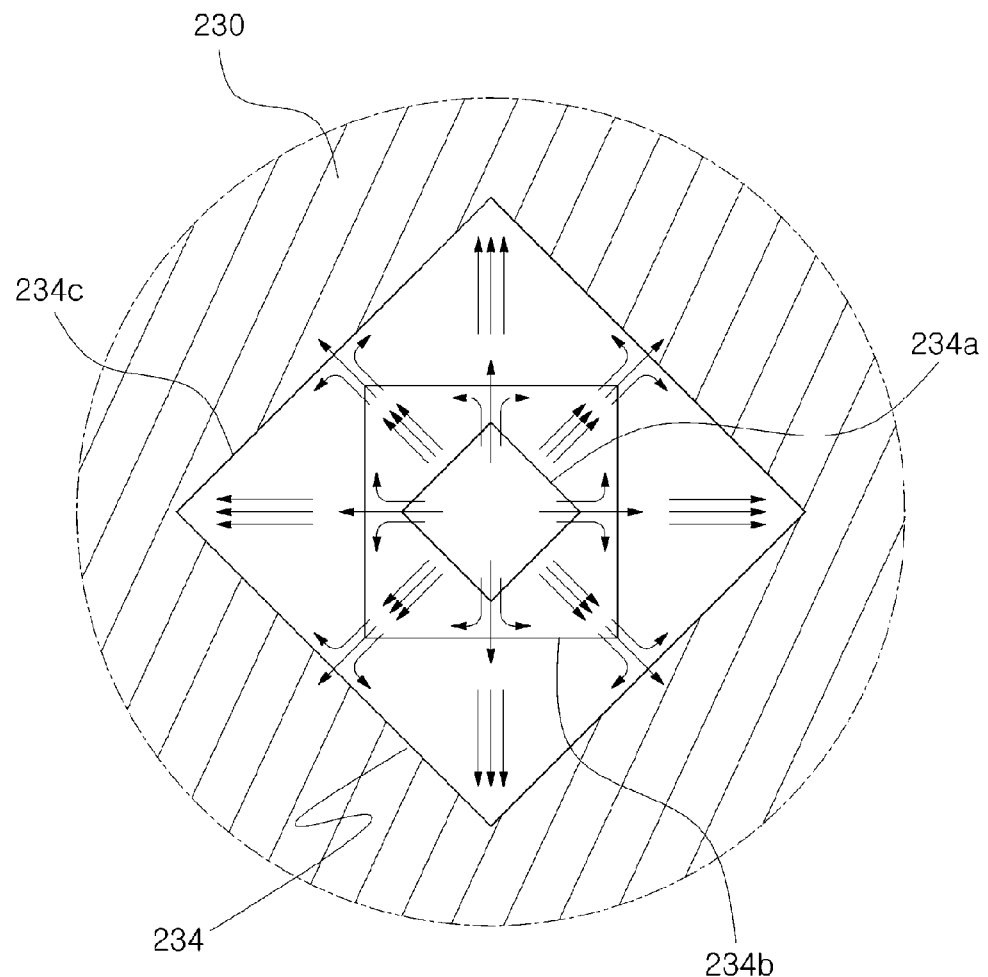
FIG. 9 is a top-plan view taken in the A-A direction of FIG. 6, schematically showing the direction in which heat flows.

In addition, the hollow central section 234 has a multi-stepped structure in which each of stepped portions has a corner. The oblique length of a lower stepped portion is greater than an upper stepped portion. That is, as shown in FIG. 9, the oblique length of a first hollow portion 234a which is disposed at the uppermost portion is shorter than the oblique length of a second hollow portion 235b which is below the first hollow portion 234a. In the same fashion, the oblique length of a third hollow portion 234c which is formed below the second hollow portion 234b is longer than the oblique length of the second hollow portion 235b.

At this time, the first hollow portion 234a, the second hollow portion 234b and the third hollow portion 234c can be formed so as to have a quadrangular circumference and be arranged to be offset by 45° from each other. That is, the second hollow portion 234b is formed to be offset by 45° with respect to the quadrangular circumference of the first hollow portion 234a, and the third hollow portion 234c is also formed to be offset by 45° with respect to the quadrangular circumference of the second hollow portion.

In general, in the angled structure shown in FIG. 9, heat that flows at the central portion of the corner has strong tendency to flow straight. In the other portions, the flow of heat tends to gather at the corner.

Considering this characteristic of heat, the hollow central section 234 in which air is contained has the multi-stepped structure including the first, second and third hollow portions, and heat which would otherwise gather at the corners of the first hollow portion is allowed to flow to the corners of the second hollow portion. Accordingly, heat dissipation effect can be increased.

Here, although the hollow central section 234 was illustrated as including three hollow portions, this is not intended to be limiting. It should be understood that two hollow portions or any number of hollow portions greater than three can be formed. In addition, the angle between two upper and lower hollow portions which are adjacent to each other can be any angle other than 45°. In addition, although the hollow section was illustrated as being the quadrangular structure, this is not intended to be limiting. It should be understood that the hollow section can have the shape of a multi-stepped column having a circular cross-section or a quadrangular cross-section, such as a triangular or pentagonal cross-section.

In the meantime, the first and second heatsinks 230 and 260 can be made of a metal material having superior heat conductivity, such as Al, in order to effectively dissipate heat generated through the light emission of the light sources. A plurality of heat dissipation fins 239 may be provided on the outer surface of the heatsink 230, in particular, in the circumferential direction of the heatsink 230 in order to increase heat dissipation efficiency by increasing the heat dissipation area.

In addition, a third light source 213 can be added on the central portion of the top surface of the substrate 220. Heat generated from the third light source 213 is rapidly dissipated through the hollow central section 234 of the first heatsink 230.

In addition, as shown in FIG. 7, a resin 235 having superior heat conductivity or a high insulation resin may be disposed in the hollow central section 234.

In the meantime, a first reflecting surface 232 is provided on the outer surface of the first heatsink 230 in order to refract light that has been emitted from the second light source 212 to the cover part 250. That is, the first reflecting surface 232 on the outer surface of the first heatsink 230 refracts part of light emitted from the second light source 212 that collides against the outer surface of the first heatsink 230 without being directed toward the cover part 250 so that the refracted part of light is redirected toward the cover part 250.

Consequently, the first reflecting surface 232 on the outer surface of the first heatsink 230 can refract the part of light emitted from the second light source 212 in the direction toward the cover part 250, thereby increasing the light distribution area.

This first reflecting surface 232 is formed by cutting in the downward direction from the edge of the mounting area 231 and extends to the lower end to which the cover part 250 is coupled. The first reflecting surface 232 can be formed as an inclined surface that is inclined a preset angle in the direction toward the cover part 250 as extending downward from the mounting area 231, or a curved surface that is curved toward the cover part 250 as extending downward from the mounting area 231.

Likewise, a second reflecting surface 262 can be provided on the inner surface of the second heatsink 260 that faces the first light source 211 in order to reflect light emitted from the first light source 211.

The second reflecting surface 262 is formed by cutting from the upper end of the second heatsink 260 to the lower end in the direction toward the first light source 211. The second reflecting surface 262 can be formed as an inclined surface that is inclined a preset angle in the direction toward the first light source 211 as extending from the upper end to the lower end, or a curved surface that is curved toward the first light source 211 as extending from the upper end to the lower end.

Although the first and second reflecting surfaces were shown and illustrated as being an inclined surface or a curved surface, this is not intended to be limiting. It should be understood that the first and second reflecting surfaces can have a variety of shapes in which a straight line and a curved line are combined or the shapes of the first and second reflecting surfaces may differ from each other.

A variety of shapes are possible. For instance, the first reflecting surface may be formed as a curved surface, whereas the second reflecting surface may be formed as an inclined surface. Otherwise, the first reflecting surface may be formed as an inclined surface, whereas the second reflecting surface may be formed as a combination of a curved surface and an inclined surface.

In addition, each of the first and second reflecting surfaces 232 and 262 can be provided with at least one reflecting layer 233, 264. These reflecting layers 233 and 264 can be formed by depositing a reflective material that has high light reflectance, such as $BaSO_4$, Al or Cr, in a variety of methods, such as deposition, anodizing or plating, to a preset thickness on the surface of the reflecting surfaces.

The cover part 250 having an inner space is provided over the first heatsink 230 so as to radiate light emitted from the first light source 211 and the second light source 212 to the outside while covering the light sources. It is preferred that the cover part 250 be provided as a light-diffusing cover that can diffuse light emitted from the first light source 211 and the second light source 212 before radiating it to the outside.

It is preferred that the lower end of the cover part 250 which is coupled with the upper side of the first heatsink 230 be coupled with the lower end of the first reflecting surface 232 formed on the outer surface of the first heatsink 230 such that all of light reflected from the first reflecting surface 232 can be radiated to the outside through the cover part 250.

In the meantime, the cover part 250 contains a fluorescent material therein that converts the wavelength of light that has been emitted from at least one of the first light source 211 and the second light source 212 into a different wavelength. As the fluorescent material, at least one of red, green and blue fluorescent materials can be included in order to realize light having an intended color such as white.

The fluorescent material can be provided as being applied on the inner surface of the cover part 250, or the cover part 250 can be made of a material that contains a fluorescent material.

According to the present invention as described above, the first and second light sources are mounted on the top and bottom surfaces of the substrate, respectively, in order to increase the orientation angle. The first and second light sources can also be disposed on the areas corresponding to the first and second light sources, respectively, in order to dissipate heat generated from the first and second light sources, thereby improving light dissipation efficiency.

Third Embodiment

Figure 10:
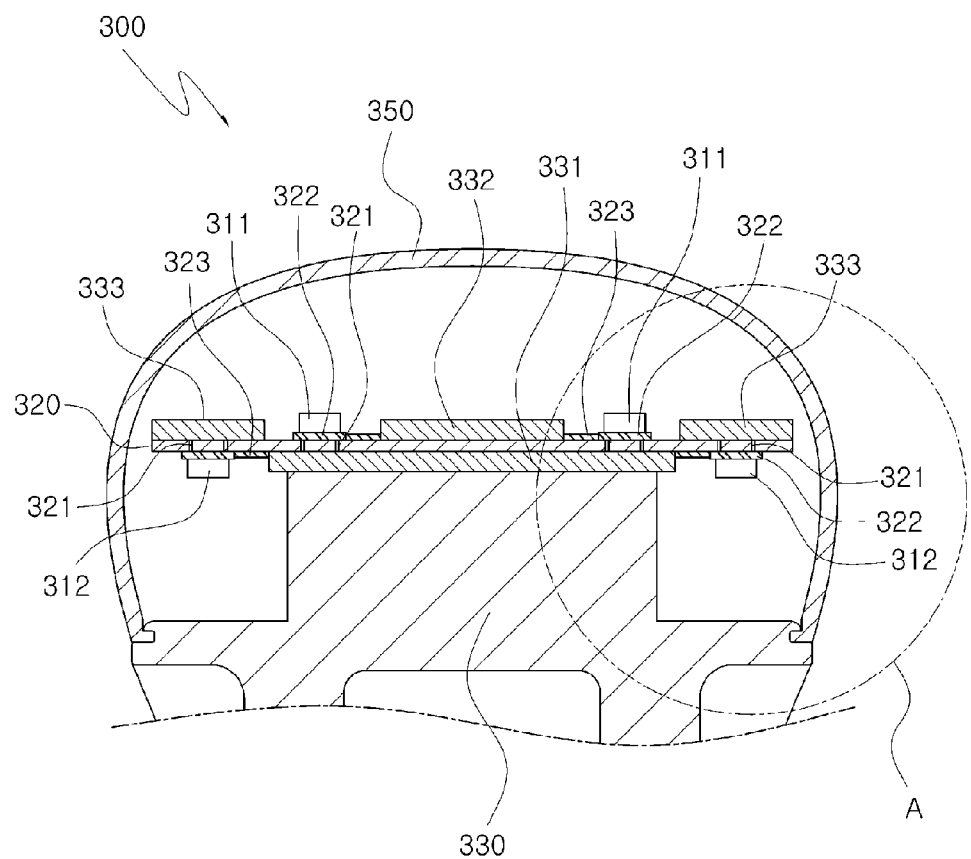
FIG. 10 is a cross-sectional view showing a part of a third embodiment of the LED lamp according to the present invention.

As shown in FIG. 1 and FIG. 10, an LED lamp 300 according to a third embodiment of the present invention includes a substrate 320, LEDs 311 and 312 which form a light source, heat dissipation pads 331, 332 and 333 provided on the substrate, a heatsink 330, a base part 340 and a cover part 350.

The light sources are mounted on the top and bottom surfaces of the substrate 320 to radiate light to the outside. According to the third embodiment of the present invention, first LEDs 311 mounted on the top surface of the substrate 320 and second LEDs 312 mounted on the bottom surface of the substrate can be used as light sources.

That is, in the present invention, the light sources are configured as the first LEDs 311 and the second LEDs 312 which are mounted on the top and bottom surfaces of the substrate 320. The first LEDs 311 radiate light forwards of the LED lamp 300, upwards in FIG. 1. The second LEDs 312 radiate light sideways and backwards of the LED lamp 300, i.e. to the right and left and downwards in FIG. 1.

In this fashion, the first LEDs 311 and the second LEDs 312 which are the light sources according to the present invention are mounted on the top and bottom surfaces of the substrate 320 in order to radiate light to outer areas by dividing the areas. Therefore, the LED lamp can overcome the limitation of LEDs which radiate light in a linear direction and thus realize light distribution characteristics similar to those of an incandescent lamp.

Here, the first LEDs 311 and the second LEDs 312 can be provided as a chip on board (COB) in which a plurality of LED chips is integrated on a board to form a light-emitting chip, a package type LED device which includes a lead frame, or a combination thereof. In addition, the color of light emitted from the first LEDs 311 and the second LEDs 312 can be any one of red, blue, green and white The substrate 320 is a substrate member on which the first LEDs 311 and the second LEDs 312, i.e. the light sources, are mounted, is electrically connected with external power that is supplied through a power cable (not shown), and has a preset circuit pattern formed on the top and bottom surfaces through which power can be supplied to the first LEDs 311 or the second LEDs 312.

This substrate 320 can be mounted on the mounting surface which is formed on the top surface of the heatsink 330. The area of the substrate 320 can be greater than the mounting area such that the outermost circumstance of the substrate 320 protrudes outward from the mounting area. Accordingly, the second LEDs 312 can be mounted along the circumference or edge of the bottom surface of the substrate 320 which protrudes outward from the mounting area.

Here, the first substrate 320 can have the shape of a disc or a polygonal plate, such as a triangular or quadrangular plate.

The lower heat dissipation pad 331 can be provided on the bottom surface of the substrate 320. The lower heat dissipation pad 331 can be implemented as a copper film having a preset thickness. In order to improve heat dissipation effect, the thickness and the area of the lower heat dissipation pad 331 can be greater than those of another pad or pattern provided on the substrate 320 for a different use. The lower heat dissipation pad 331 is provided on the bottom surface of the substrate 320 corresponding to the area of the top surface of the substrate on which the first LEDs 311 are disposed, and can be used to effectively diffuse heat generated from the first LEDs 311.

In the meantime, in order to further increase the heat conduction efficiency, the substrate 320 can include heat conduction vias 321 in the areas on which the first LEDs 311 are disposed. Heat generated from the first LEDs 311 can be more effectively transmitted to the lower heat dissipation pad 331 which is provided on the opposite side of the substrate.

In addition, the LEDs 311 can be disposed on the mounting pad 322 which is made of a metal material having superior heat conductivity. In the embodiment including the mounting pad 322, the heat conduction vias 321 can directly adjoin to the mounting pad 322 and the lower dissipation pad 331, thereby improving heat conductive effect.

As described above, the third embodiment of the present invention can include the second LEDs 312 disposed on the bottom surface of the substrate 320. In order to effectively dissipate heat generated from the second LEDs 312, the third embodiment of the present invention can include the upper heat dissipation pad 333 on the top surface of the substrate 320. The upper heat dissipation pad 333 can be provided on the top surface of the substrate 320 corresponding to the area on which the second LEDs 312 are disposed, such that heat generated from the second LEDs 312 can be effectively dissipated. In order to improve the heat dissipation effect, the thickness and area of the upper dissipation pad 333 can also be greater than those of another pad or pattern which is provided on the substrate 320 for a different use.

In addition, in order to further increase the heat conduction efficiency of the upper heat dissipation pad 333, the substrate 320 can include heat conduction vias 321 in the areas on which the second LEDs 312 are disposed such that the heat conduction vias 321 adjoin to the upper heat dissipation pad 333.

Like the first LEDs 311 as described above, the second LEDs 312 can be mounted on the bottom surface of the substrate 320 via a mounting pad 322 having superior heat conductivity. In this case, the heat conduction vias 321 can adjoin to the mounting pad 322 and the upper heat dissipation pad 333 in order to further improve heat conduction effect.

In the meantime, in addition to the heat dissipation pad which is provided to face the first LEDs 311 or the second LEDs 312, an additional heat dissipation pad 332 can be provided on a partial area of the top or bottom surface of the substrate 320 (FIG. 10 shows an example in which the heat dissipation pad is provided on the top surface of the substrate). This heat dissipation pad 332 can be in thermal contact with the first LEDs 311 or the second LEDs 312, which are mounted on the same surface of the substrate 320, through a heat conduction pattern 323.

For instance, the third embodiment of the present invention can further include the heat conduction pattern 323 which is formed on the top surface of the substrate 320 such that the mounting pad 322 for the first LEDs 311, which are disposed on the top surface of the substrate 320, is in thermal contact with the heat dissipation pad 332.

Furthermore, a heat conduction pattern 323 can also be provided on the bottom surface of the substrate 320. Through the heat conduction pattern 323, the mounting pad 322 for the second LEDs 312, which are disposed on the bottom surface of the substrate 320, is in thermal contact with the lower heat dissipation pad 331. Through this, part of heat generated from the first LEDs 311 can be dissipated through not only the lower heat dissipation pad 331 but also the upper heat dissipation pad 333, and part of heat generated from the second LEDs 312 can be dissipated also through the lower heat dissipation pad 331. Accordingly, more superior heat dissipation effect can be expected.

The heatsink 330 is coupled with the base part 340 to form the overall contour of the LED lamp 300, and serves to dissipate heat generated through the light emission of the light sources to the outside. This heatsink 330 can be made of a metal material having superior heat conductivity, such as Al, in order to effectively dissipate heat generated through the light emission of the light sources. A plurality of heat dissipation fins 339 may be provided on the outer surface of the heatsink, in particular, in the circumferential direction in order to increase heat dissipation efficiency by increasing the heat dissipation area.

The heatsink 330 can be configured to directly adjoin to the lower heat dissipation pad 331 in order to further improve heat dissipation effect.

In addition, inner heat dissipation fins (not shown) can be provided on the bottom side of the portion of the heatsink 330 which directly adjoins to the lower heat dissipation pad 331, thereby further improving heat dissipation effect.

The heatsink 330 may extend a height such that a surface that adjoins to the lower heat dissipation pad 331 can be disposed at the middle of the height of the cover part 350 when the heatsink 330 is coupled with the cover part 350. Accordingly, the first LEDs 311 and the second LEDs 312 which are mounted on the top and bottom surfaces of the substrate 320 are also disposed at the middle of the height of the cover part 350. Light emitted from the first LEDs 311 is radiated to the outside through the upper area of the cover part 350, and light emitted from the second LEDs 312 is radiated to the outside through the lower area of the cover part 350.

Here, a reflecting layer can also be provided on the side surface of the heatsink 330 in order to refract part of light emitted from the second LEDs 312 in the direction toward the cover part 350.

Figure 11A:
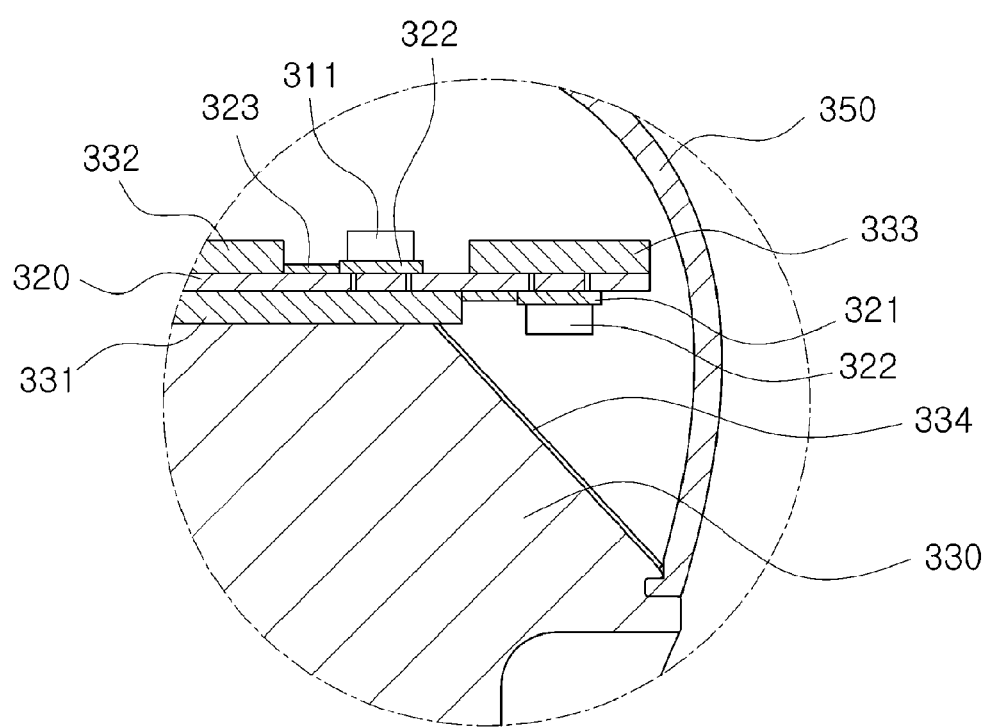
FIG. 11a and FIG. 11b are views showing a variety of shapes of a reflecting layer of the third embodiment of the LED lamp according to the present invention.
Figure 11B:
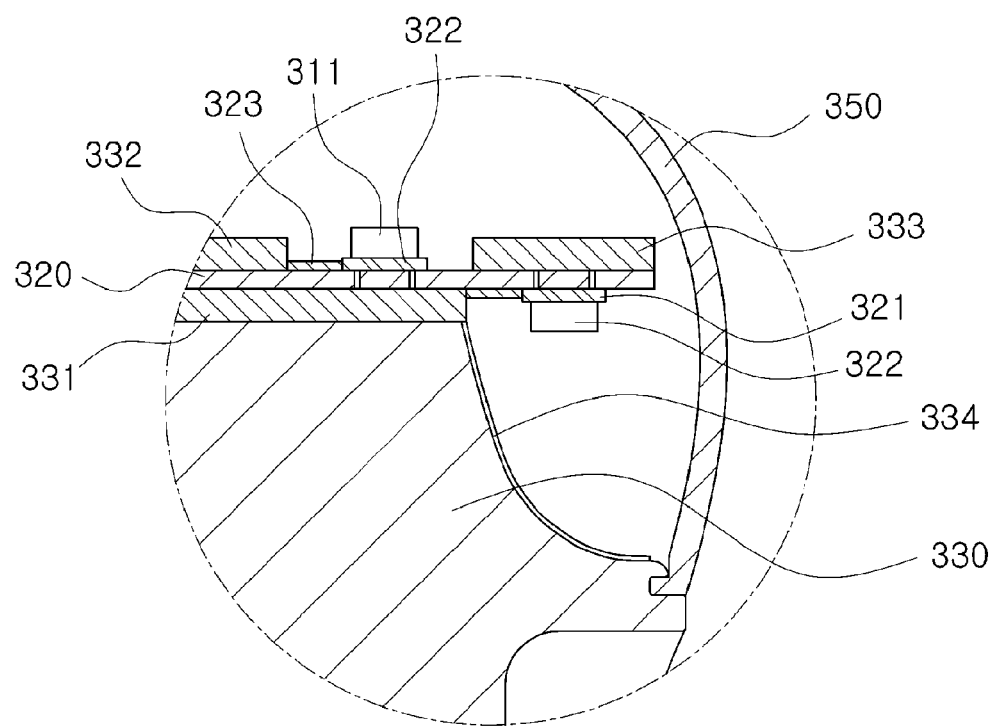

FIG. 11a and FIG. 11b are views showing a variety of shapes of the reflecting layer of the LED lamp 300 according to of the third embodiment of the present invention.

As shown in FIG. 11a and FIG. 11b, the reflecting layer 334 extends downward from the portion of the heatsink 330 that adjoins to the lower heat dissipation pad 331. The reflecting layer 334 reflects part of light emitted from the second LEDs 312 that is directed toward the heatsink 330 instead of toward the cover part 350 so that the reflected part of light can be radiated in the direction toward the cover part 350.

For this, the side surface of the heatsink 330 can be formed as an inclined surface that is inclined downward a preset angle with respect to the horizontal direction of the substrate 320 (i.e. toward the light-transmitting cover part 350) as shown in FIG. 11a, or a curved surface that is curved in the horizontal direction as extending away from the substrate 320 as shown in FIG. 11b.

Since part of light emitted from the second LEDs 312 is reflected toward the cover part 350 from the above-described reflecting layer 334 formed on the side surface of the heatsink 330, it is possible to increase the orientation angle of the LED lamp 300 and realize light distribution characteristics similar to those of an incandescent lamp.

The reflecting layer 334 can be provided so as to extend from the surface that adjoins to the substrate 320 and the lower dissipation pad 331 to the lower end of the cover part 350.

The reflecting layer 334 can be formed to a preset thickness on the surface of the reflecting surface. The reflecting layer can be made of a reflective material that has high light reflectance, such as Al or Cr, in a variety of methods, such as deposition, anodizing or plating.

The base part 340 which supplies external electric power to the LED lamps 300 is coupled to the lower portion of the heatsink 330. The base part 340 houses a power supply 134 which supplies the electric power to the substrate 320. The base part 340 also includes a typical socket-shaped connecting part 342 on the lower end which can receive electric power from the outside and supply the received electric power to the power supply. The connecting part 342 is fabricated in the same shape as a socket of a typical incandescent lamp so as to replace the incandescent lamp.

The cover part 350 is provided on the upper outer circumference of the heatsink 330. The cover part 350 can radiate light emitted from the first and second light sources 311 and 312 to the outside while protecting the first and second light sources 311 and 312 from the outer atmosphere. It is preferred that the cover part 350 be provided as a light-diffusing cover that can diffuse light emitted from the first and second light sources 311 and 312 before radiating it to the outside.

The lower end of this cover part 350 which is coupled with the heatsink 330 is coupled with the lower end of the reflecting surface. Accordingly, all of light reflected from the reflecting layer 334 can be radiated outwards through the cover part 350.

Although the cover part 350 was illustrated as having parabolic shapes having different curvatures, this is not intended to be limiting. It should be understood that the cover part can have a variety of shapes, such as a hemisphere or a polygonal shape.

In addition, the open lower end of the cover part 350 was illustrated as being fitted to the heatsink 330, this is not intended to be limiting. It should be understood that a variety of known coupling mechanisms, such as screw coupling or interference fitting, can be used.

The invention claimed is:

1. A light-emitting diode lamp, comprising:
   a substrate;
   at least one first light source disposed on a first surface of the substrate;
   at least one second light source disposed on a second surface of the substrate opposite to the first surface; and
   a heat dissipation part comprising a first heatsink disposed on the second surface of the substrate and corresponding to the at least one first light source, and a second heatsink disposed on the first surface of the substrate and corresponding to the at least one second light source.

2. The light-emitting diode lamp of claim 1, wherein the second heatsink comprises a reflecting surface configured to reflect light emitted from the at least one first light source.

3. The light-emitting diode lamp of claim 2, wherein the reflecting surface comprises at least one reflecting layer.

4. The light-emitting diode lamp of claim 2, wherein a cross-section of the reflecting surface comprises an inclined shape, a curved shape, or both the inclined shape and the curved shape.

5. The light-emitting diode lamp of claim 1, wherein the first heatsink comprises a mounting surface on which the substrate is disposed.

6. The light-emitting diode lamp of claim 5, wherein the first heatsink comprises a central hollow section, the central hollow section extending in a height direction.

7. The light-emitting diode lamp of claim 6, wherein the central hollow section comprises a multi-stepped structure, wherein the multi-stepped structure comprises stepped portions, and each stepped portion comprises a corner, wherein an oblique length of a lower stepped portion of the stepped portions is greater than an oblique length of an upper stepped portion of the stepped portions, and wherein corners of each stepped portion of the stepped portions are offset from corners of an adjacent stepped portion of the stepped portions.

8. The light-emitting diode lamp of claim 7, wherein the multi-stepped structure of the central hollow section comprises quadrangular cross-sections offset by 45° from each other.

9. The light-emitting diode lamp of claim 6, wherein a heat conductive resin or an insulating resin is disposed in the central hollow section.

10. The light-emitting diode lamp of claim 6, further comprising a third light source disposed on a top surface of the substrate and corresponding to the central hollow section.

11. The light-emitting diode lamp of claim 5, wherein the first heatsink comprises a reflecting surface configured to reflect light emitted from the at least one second light source.

12. The light-emitting diode lamp of claim 11, wherein the reflecting surface comprises at least one reflecting layer.

13. The light-emitting diode lamp of claim 1, further comprising a cover part disposed on the at least one first light source and the at least one second light source.

14. The light-emitting diode lamp of claim 13, further comprising a fluorescent material disposed inside the cover part, the fluorescent material configured to convert a first wavelength of light emitted from the first or second light source into a second wavelength.

15. The light-emitting diode lamp of claim 1, wherein the first heatsink and the second heatsink are directly disposed on a metal layer disposed on the substrate.

16. A light-emitting diode lamp, comprising:
a substrate;
at least one light-emitting diode disposed on a first surface of the substrate;
a lower heat dissipation pad disposed on a second surface of the substrate opposite to the first surface;
a heatsink directly disposed on the lower heat dissipation pad;
a second light-emitting diode disposed on the second surface of the substrate; and
an upper heat dissipation pad disposed on the first surface of the substrate.

17. The light-emitting diode lamp of claim 16, further comprising at least one heat conduction via disposed between the at least one first light-emitting diode and the substrate, wherein a first end of the at least one heat conduction via is directly disposed on the lower heat dissipation pad.

18. The light-emitting diode lamp of claim 17, further comprising a first mounting pad disposed between the substrate and the at least one first light-emitting diode.

19. The light-emitting diode lamp of claim 18, wherein a second end of the at least one heat conduction via is directly disposed on the first mounting pad.

20. The light-emitting diode lamp of claim 18, wherein a thickness of the lower heat dissipation pad is greater than a thickness of the first mounting pad.

21. The light-emitting diode lamp of claim 18, wherein an area of the lower heat dissipation pad is greater than an area of the first mounting pad.

22. The light-emitting diode lamp of claim 16, further comprising at least one heat conduction via disposed between the second light-emitting diode and the substrate, wherein a first end of the at least one heat conduction via is directly disposed on the upper heat dissipation pad.

23. The light-emitting diode lamp of claim 22, further comprising a second mounting pad disposed between the substrate and the second light-emitting diode.

24. The light-emitting diode lamp of claim 23, wherein a second end of the at least one heat conduction via is directly disposed on the second mounting pad.

25. The light-emitting diode lamp of claim 23, wherein a thickness of the upper heat dissipation pad is greater than a thickness of the second mounting pad.

26. The light-emitting diode lamp of claim 23, wherein an area of the upper heat dissipation pad is greater than an area of the second mounting pad.

27. The light-emitting diode lamp of claim 16, further comprising a reflecting layer disposed on a side surface of the heatsink, the reflecting layer configured to reflect light emitted from the second light-emitting diode in a horizontal direction extending away from the substrate.

28. The light-emitting diode lamp of claim 27, wherein the side surface of the heatsink comprises an inclined surface that is inclined with respect to the horizontal direction.

29. The light-emitting diode lamp of claim 27, wherein the side surface of the heatsink comprises a curved surface that is curved with respect to the horizontal direction.

30. A light-emitting diode lamp, comprising:
a substrate;
at least one first light-emitting diode disposed on a first surface of the substrate;
a first mounting pad disposed between the substrate and the at least one first light-emitting diode;
a second light-emitting diode disposed on a second surface of the substrate opposite to the first surface;
a second mounting pad disposed between the substrate and the second light-emitting diode;
a lower heat dissipation pad disposed on the second surface of the substrate;
an upper heat dissipation pad disposed on the first surface of the substrate; and
a heatsink directly disposed on the lower heat dissipation pad.

31. The light-emitting diode lamp of claim 30, wherein the substrate comprises:
at least one first heat conduction via, ends of which are directly disposed on the first mounting pad and the lower heat dissipation pad, respectively; and
at least one second heat conduction via, ends of which are directly disposed on the second mounting pad and the upper heat dissipation pad, respectively.

32. The light-emitting diode lamp of claim 30, further comprising:
a first heat conduction pattern disposed on a top surface of the substrate, wherein the first mounting pad and the upper heat dissipation pad thermally contact each other; and
a second heat conduction pattern disposed on the second surface of the substrate such that the second mounting pad and the lower heat dissipation pad thermally contact each other.

* * * * *